United States Patent
Harada et al.

(10) Patent No.: US 9,276,516 B2
(45) Date of Patent: Mar. 1, 2016

(54) REFRIGERATION APPARATUS

(75) Inventors: Yoshiyuki Harada, Kusatsu (JP); Toshiyuki Maeda, Kusatsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 451 days.

(21) Appl. No.: 13/643,134

(22) PCT Filed: Apr. 28, 2011

(86) PCT No.: PCT/JP2011/002523
§ 371 (c)(1), (2), (4) Date: Oct. 24, 2012

(87) PCT Pub. No.: WO2011/138864
PCT Pub. Date: Nov. 10, 2011

(65) Prior Publication Data
US 2013/0036759 A1 Feb. 14, 2013

(30) Foreign Application Priority Data

May 6, 2010 (JP) ................................. 2010-106148

(51) Int. Cl.
| H02M 1/32 | (2007.01) |
| H02P 27/08 | (2006.01) |
| F25B 31/00 | (2006.01) |
| H02P 29/00 | (2006.01) |
| H02M 1/44 | (2007.01) |
| F25B 49/02 | (2006.01) |

(52) U.S. Cl.
CPC .............. *H02P 27/08* (2013.01); *F25B 31/006* (2013.01); *F25B 49/025* (2013.01); *H02M 1/44* (2013.01); *H02P 29/0088* (2013.01); *F25B 2600/021* (2013.01); *F25B 2600/024* (2013.01); *H02M 2001/327* (2013.01); *Y02B 30/741* (2013.01)

(58) Field of Classification Search
CPC ............. F25B 31/006; F25B 2600/021; F25B 2600/024; F25B 2700/15
USPC ........................... 62/228.1, 228.4, 230, 259.2
See application file for complete search history.

(56) References Cited

U.S. PATENT DOCUMENTS

| 4,587,605 A | 5/1986 | Kouyama et al. |
| 5,123,080 A * | 6/1992 | Gillett et al. ................... 388/811 |
| 2002/0074969 A1* | 6/2002 | Edelson ......................... 318/801 |

(Continued)

FOREIGN PATENT DOCUMENTS

| JP | 60-152297 A | 8/1985 |
| JP | 8-331856 A | 12/1996 |

(Continued)

*Primary Examiner* — Judy Swann
*Assistant Examiner* — Zachary R Anderegg
(74) *Attorney, Agent, or Firm* — Birch, Stewart, Kolasch & Birch, LLP

(57) ABSTRACT

A refrigeration apparatus includes a refrigerant circuit with a compressor, a power module, a refrigerant cooler in contact with the power module, and an IPM motor which drives the compressor. A refrigerant in the refrigerant circuit flows through the refrigerant cooler, and cooling of the power module is performed by dissipating heat to the refrigerant flowing in the refrigerant cooler. A controller in the refrigeration apparatus outputs a driving signal to a drive circuit to reduce the number of switching operations of switching elements by performing overmodulation control such that there exists a carrier cycle in which no switching is performed.

3 Claims, 14 Drawing Sheets

(56) References Cited

U.S. PATENT DOCUMENTS

| | | | |
|---|---|---|---|
| 2003/0226370 A1* | 12/2003 | Tanimoto et al. | 62/259.2 |
| 2005/0231142 A1 | 10/2005 | Yoshinaga et al. | |
| 2010/0231151 A1* | 9/2010 | Ohtani et al. | 318/400.09 |
| 2011/0072841 A1* | 3/2011 | Arai | B60H 1/00278 62/259.2 |
| 2011/0083467 A1 | 4/2011 | Asano et al. | |
| 2012/0111043 A1* | 5/2012 | Hatakeyama et al. | 62/190 |

FOREIGN PATENT DOCUMENTS

| | | |
|---|---|---|
| JP | 2005-160183 A | 6/2005 |
| JP | 2005-304238 A | 10/2005 |
| JP | 2008-57870 A | 3/2008 |
| JP | 2009-268304 A | 11/2009 |
| JP | 2009-293907 A | 12/2009 |
| JP | 2009-295916 A | 12/2009 |
| JP | 2010-7974 A | 1/2010 |
| JP | 2010-25374 A | 2/2010 |

* cited by examiner

FIG.10
(A)
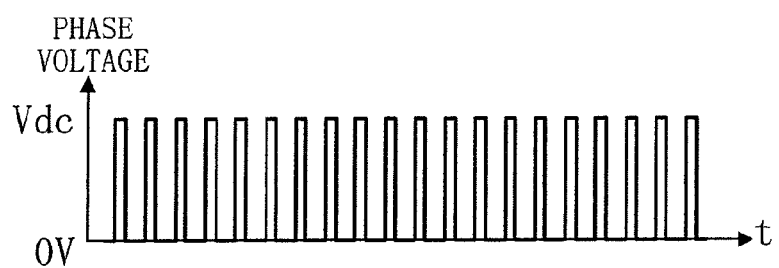
(B)
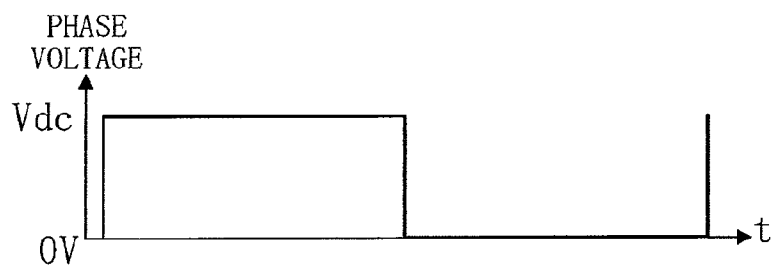

FIG.13
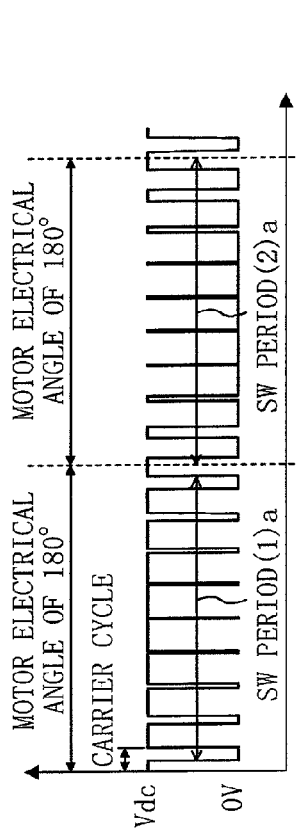
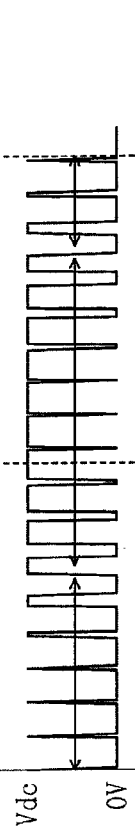
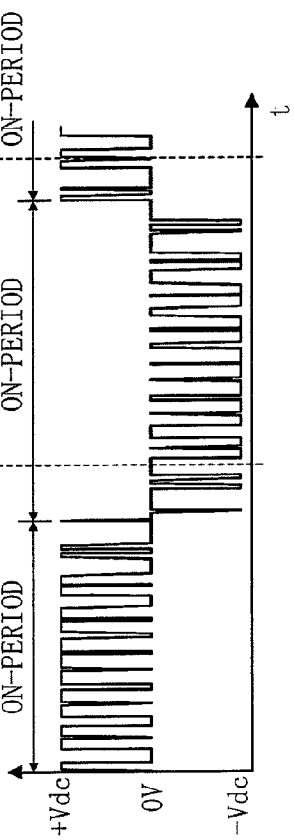
(A) PHASE VOLTAGE WAVEFORM DURING SINUSOIDAL WAVE OPERATION (U-PHASE)
(B) PHASE VOLTAGE WAVEFORM DURING SINUSOIDAL WAVE OPERATION (V-PHASE)
(C) VOLTAGE BETWEEN OUTPUT LINES OF INVERTER (BETWEEN PHASES U AND V)
← PERIOD WHEN VOLTAGE IS CONTROLLED BY SWITCHING

REFRIGERATION APPARATUS

TECHNICAL FIELD

The present invention relates to refrigeration apparatuses.

BACKGROUND ART

A refrigeration apparatus which performs a vapor compression refrigeration cycle by circulating a refrigerant includes an electric circuit, such as an inverter circuit, to control an operation state of an electric motor of a compressor. In general, a power element which generates high heat is used as the inverter circuit. Thus, a means for cooling the power element is provided to prevent the power element from generating heat higher than an operable temperature of the power element (see, for example, Patent Document 1).

Patent Document 1 discloses a refrigerant cooler through which a refrigerant flowing between the expansion valve of the refrigerant circuit and the outdoor side heat exchanger flows. The refrigerant cooler is brought into contact with a power element to cool the power element by the refrigerant flowing in the refrigerant cooler.

CITATION LIST

Patent Document

Patent Document 1: Japanese Patent Application No. 2010-25374

SUMMARY OF THE INVENTION

Technical Problem

Some of the power elements include an insulated gate bipolar transistor (IGBT) bear chip, a heat spreader, an internal electrode, an insulator, and a metal plate which are layered and contained in one package. In a power element of such a structure, a capacitor is formed inside the power element between the internal electrode and the metal plate, with the insulator serving as a dielectric. If the power element is attached to a refrigerant cooler made of a conductive material, a capacitor is formed inside the power element between the metal plate and the refrigerant cooler, with the package serving as a dielectric. These capacitors are connected in series. The refrigerant cooler is connected to a refrigerant pipe, and is grounded through a casing and a ground lead.

When a switching element which comprises the power element performs switching, a high frequency current flows through a capacitor formed between the witching element and the refrigerant cooler due to variations in potential of the internal electrode relative to ground potential. The high frequency current flows out of the apparatus through the casing and the ground lead. When the high frequency current which flowed out of the apparatus exceeds a predetermined level, noise problems, such as disturbance voltage, leakage current, etc., may arise. A noise filter may be provided to reduce the noise caused by the leakage current, which however increases costs, and is not preferable.

The present invention was made in view of the above problems, and the invention is intended to effectively reduce a high frequency current which leaks from a refrigerant cooler, when cooling a switching element using the refrigerant cooler in which a refrigerant flowing in a refrigerant circuit flows.

Solution to the Problem

The present invention is directed to a refrigeration apparatus including a refrigerant circuit (10) in which a compressor (11), a heat source-side heat exchanger (12), an expansion mechanism (13), and a utilization-side heat exchanger (14) are connected to perform a refrigeration cycle, and the present invention provides the following solutions.

Specifically, the first aspect of the present invention is a refrigeration apparatus, including: a refrigerant circuit (10) in which a compressor (11), a heat source-side heat exchanger (12), an expansion mechanism (13), and a utilization-side heat exchanger (14) are connected to perform a refrigeration cycle, wherein the refrigeration apparatus includes a power module (61) including a plurality of switching elements (37) each of which converts an input voltage to an AC voltage having a predetermined frequency and a predetermined voltage value, a drive motor (18) which drives the compressor (11), a rectifier circuit (32) which supplies a DC link voltage (vdc) to the power module (61), a refrigerant cooler (81) in which a refrigerant in the refrigerant circuit (10) flows and which cools the power module (61), and a control section (60) which controls an operation of each of the switching elements (37), thereby performing control such that there exists a carrier cycle (T) in which no switching is performed.

In the first aspect of the present invention, the driving of a plurality of switching elements (37) is controlled so that the input voltage can be converted to an AC voltage having a predetermined frequency and a predetermined voltage value. Each of the switching elements (37) is cooled by dissipating heat to the refrigerant flowing in the refrigerant cooler (81). Further, each of the switching elements (37) is controlled by the control section (60) such that there exists a carrier cycle in which no switching is performed.

In this configuration, the high frequency current which leaks from the refrigerant cooler (81) can be effectively reduced, when cooling the switching elements (37) using the refrigerant cooler (81).

Specifically, if the switching elements (37) are attached to the refrigerant cooler (81) made of a conductive material, a capacitor is formed between the power module (61) and the refrigerant cooler (81), with a resin-molded package which forms the power module (61) serving as a dielectric. The capacitor is grounded through a refrigerant pipe of the refrigerant cooler (81). Here, when the switching elements (37) perform switching, a high frequency current flows through the capacitor due to variations in potential of the internal electrode of each of the switching elements (37) relative to ground potential. The high frequency current flows out of the apparatus through the casing accommodating the heat source-side heat exchanger (12) and the compressor (11), and through the ground lead. Particularly in the case where the compressor (11) is operated at high power, a surge voltage increases with an increase in output current, and therefore, the high frequency current which flowed out of the apparatus may exceed a predetermined level, and noise problems, such as disturbance voltage, leakage current, etc., may arise.

On the other hand, according to the present invention, there exists a carrier cycle in which no switching is performed. Thus, the number of switching operations of the switching elements (37) is reduced, and a level of the high frequency current decreases.

The second aspect of the present invention is that in the first aspect of the present invention, the control section (60) controls switching of each of the switching elements (37) into a waveform on which such a harmonic is superimposed that increases an amplitude of a fundamental wave of a motor terminal voltage to the DC link voltage (vdc) in vicinity of a peak and a bottom of the fundamental wave of the motor terminal voltage, and that decreases the amplitude of the fundamental wave of the motor terminal voltage in other portion of the fundamental wave, thereby making the carrier cycle (T) in which no switching is performed longer than a carrier cycle (T) in a sinusoidal wave operation, while maintaining magnitude of the fundamental wave.

In this configuration, the motor terminal voltage is instantaneously increased by superimposing a harmonic on the fundamental wave component of the motor terminal voltage. As a result, it is possible to obtain a carrier cycle in which no switching is performed.

The third aspect of the present invention is that in the first or second aspect of the present invention, the control section (60) makes an on-period of each of the switching elements (37) shorter than 180° to increase a voltage in the on-period, thereby performing the control such that there exists the carrier cycle (T) in which no switching is performed.

In this configuration, a period in which no switching is necessary is obtained by making the on-period shorter than 180°.

The fourth aspect of the present invention is that in any one of the first to third aspects of the present invention, the drive motor (18) is an IPM motor, and the control section (60) controls a voltage phase or a current phase to be applied to the drive motor, thereby adjusting a motor terminal voltage in a same operation state.

In this configuration, a current phase or a voltage phase of the drive motor (18) is controlled, thereby adjusting a motor terminal voltage. As a result, it is possible to obtain a period in which no switching is necessary.

The fifth aspect of the present invention is that in any one of the first to fourth aspects of the present invention, the control section (60) does not perform the switching when a target value of the motor terminal voltage exceeds the DC link voltage (vdc).

In this configuration, switching is not performed in a carrier cycle (T) in which a target value of the motor terminal voltage exceeds the DC link voltage (vdc), thereby obtaining a period in which no switching is necessary. Thus, the first aspect of the present invention can be achieved easily and reliably.

Advantages of the Invention

According to the present invention, when cooling a switching elements (37) using a refrigerant cooler (81), it is possible to effectively reduce a high frequency current which leaks from the refrigerant cooler (81) and reduce noise caused by the leakage current.

BRIEF DESCRIPTION OF THE DRAWINGS

FIG. 4(A) shows an example phase voltage waveform in which switching is performed in every carrier cycle. FIG. 4(B) shows an example phase voltage waveform when a harmonic is superimposed on a fundamental wave component of an output voltage of a power module.

FIG. 10 shows switching patterns which correspond to the respective simulations in FIG. 9.

FIG. 13 shows timing charts for explaining switching patterns of the second variation. FIGS. 13(A) and 13(B) respectively show a U-phase voltage waveform and a V-phase voltage waveform during a sinusoidal wave operation, and FIG. 13(C) shows a voltage between output lines (a voltage between phases U and V) of the inverter circuit.

FIG. 14(A) and FIG. 14(B) respectively show a U-phase voltage waveform and a V-phase voltage waveform in the case where a period of time when the voltage is controlled by switching is shortened. FIG. 14(C) shows a voltage between output lines (a voltage between phases U and V) of the inverter circuit.

FIG. 15(A) is a vector diagram at maximum efficiency control. FIG. 15(B) is a vector diagram in which a current phase at the maximum efficiency control is delayed.

DESCRIPTION OF EMBODIMENTS

An embodiment of the present invention will be described with reference to the drawings. The foregoing embodiment is a merely preferred example in nature, and is not intended to limit the scope, applications, and use of the invention.

—General Structure—

Figure 1:
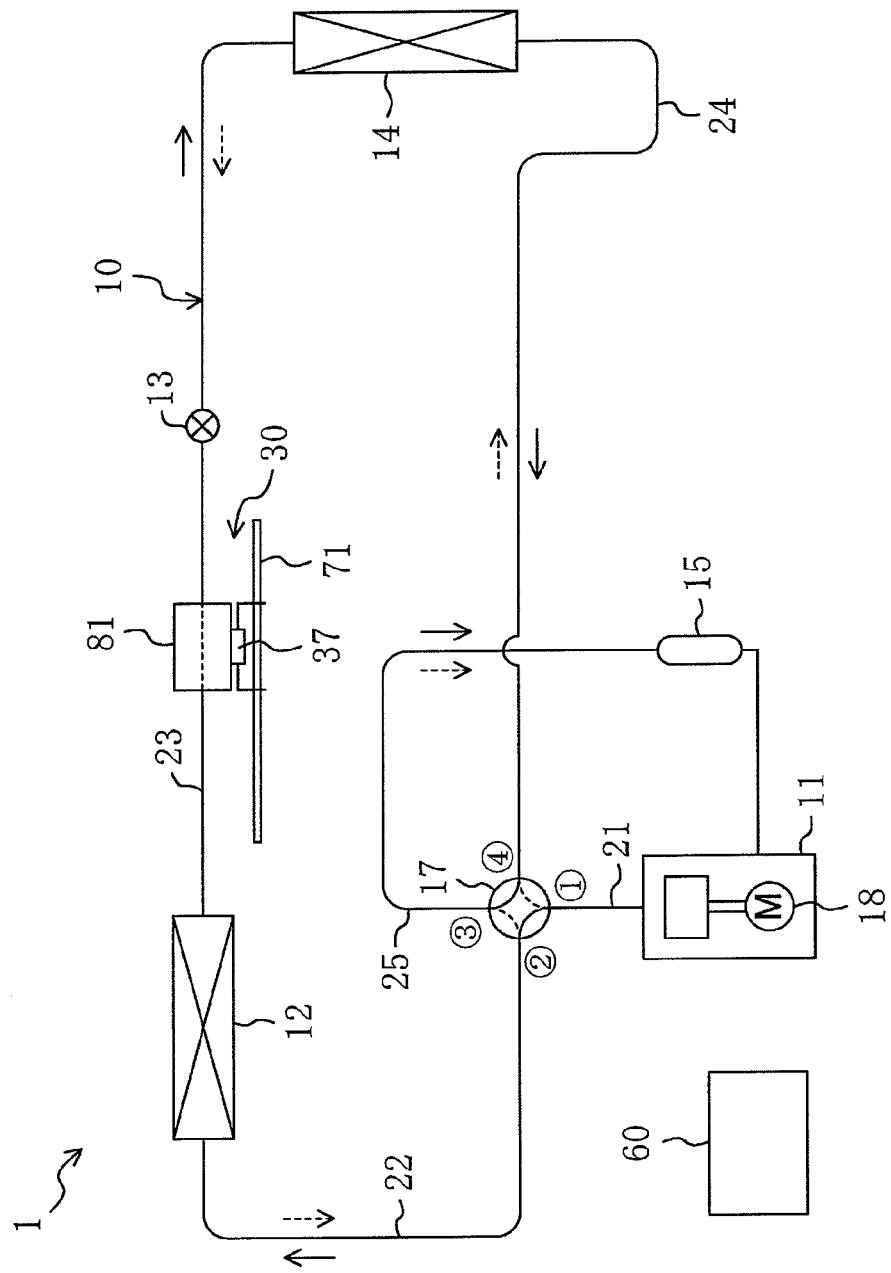
FIG. 1 is a circuit diagram schematically illustrating a configuration of an air conditioner according to an embodiment of the present invention as an example refrigeration apparatus.

FIG. 1 is a circuit diagram schematically illustrating a configuration of an air conditioner according to an embodiment of the present invention as an example refrigeration apparatus. As shown in FIG. 1, an air conditioner (1) according to an embodiment of the present invention includes a refrigerant circuit (10) which performs a vapor compression refrigeration cycle.

The refrigerant circuit (10) includes a compressor (11), a heat source-side heat exchanger (12), an expansion valve (13), and a utilization-side heat exchanger (14) which are sequentially connected with a refrigerant pipe. The refrigerant circuit (10) also includes a four-way switching valve (17) to circulate a refrigerant in a reversible manner. Although in FIG. 1, the refrigerant circuit (10) includes a four-way switching valve (17) to circulate a refrigerant in a reversible manner, the refrigerant circuit (10) may have a configuration in which a four-way switching valve (17) is not provided and the refrigerant does not circulate in a reversible manner.

The discharge side of the compressor (11) is connected to a first port of the four-way switching valve (17) via a discharge pipe (21). One end of a gas pipe (22) is connected to a second port of the four-way switching valve (17). The other end of the gas pipe (22) is connected to a gas side end of the heat source-side heat exchanger (12).

The heat source-side heat exchanger (12) is comprised, for example, of a fin-and-tube heat exchanger or a water heat exchanger, etc. A fan (not shown) as a means for exchanging heat with a refrigerant is provided near the heat source-side heat exchanger (12), or water is made to flow in the fin-and-tube heat exchanger. The structure in which a fan is provided or water is made to flow is merely an example, and the structure of the heat source-side heat exchanger (12) is not limited to such a structure. One end of a fluid pipe (23) is connected to a fluid side end of the heat source-side heat exchanger (12).

The fluid pipe (23) is provided with the expansion valve (13). Further, a refrigerant cooler (81) for cooling a switching elements (37), described later, is provided at the fluid pipe (23) at a location between the heat source-side heat exchanger (12) and the expansion valve (13). The other end of the fluid pipe (23) is connected to a fluid side end of the utilization-side heat exchanger (14).

The utilization-side heat exchanger (14) is comprised, for example, of a fin-and-tube heat exchanger or a water heat exchanger, etc. A fan (not shown) as a means for exchanging heat with a refrigerant is provided near the utilization-side heat exchanger (14), or water is made to flow in the fin-and-tube heat exchanger. The structure in which a fan is provided or water is made to flow is merely an example, and the structure of the heat source-side heat exchanger (12) is not limited to such a structure. One end of a gas communication pipe (24) is connected to a gas side end of the utilization-side heat exchanger (14). The other end of the gas communication pipe (24) is connected to a fourth port of the four-way switching valve (17).

The four-way switching valve (17) includes first to fourth ports, and is configured to switch between a first position (indicated by solid line in FIG. 1) in which the first port and the second port communicate with each other and the third port and the fourth port communicate with each other, and a second position (indicated by dashed line in FIG. 1) in which the first port and the fourth port communicate with each other and the second port and the third port communicate with each other.

One end of a suction pipe (25) is connected to the third port of the four-way switching valve (17). The other end of the suction pipe (25) is connected to the compressor (11). An accumulator (15) which removes a liquid refrigerant contained in the refrigerant so that only a gas refrigerant is sucked by the compressor (11), is provided at the suction pipe (25).

<Electric Power Supply Device>

The air conditioner (1) is provided with an electric power supply device (30) for supplying electric power to driving sections of the respective components of the refrigerant circuit (10).

Figure 2:
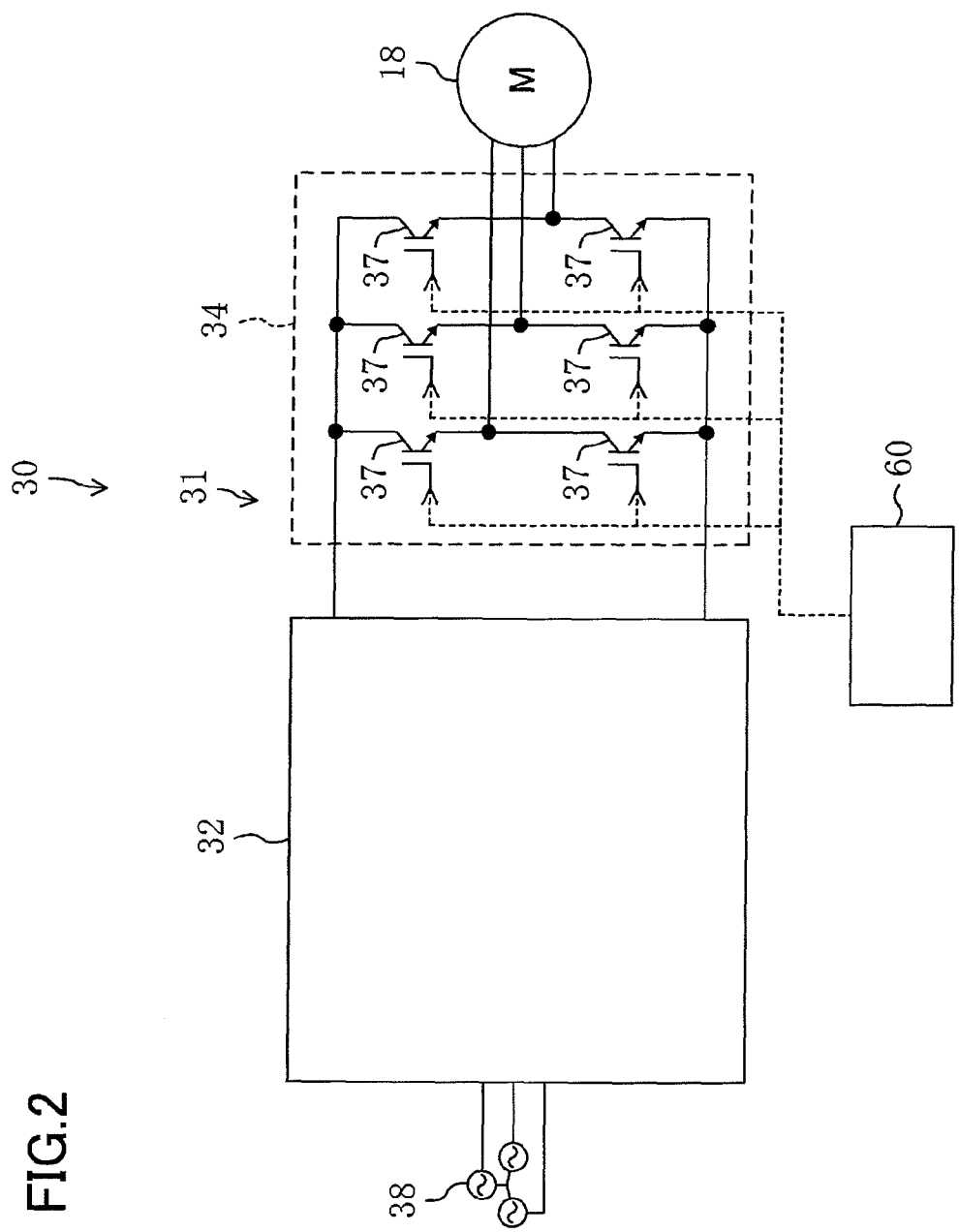
FIG. 2 is a circuit diagram schematically illustrating a configuration of a drive circuit of an electric power supply device.

FIG. 2 is a circuit diagram schematically illustrating a configuration of a drive circuit of the electric power supply device. As shown in FIG. 2, the electric power supply device (30) includes a drive circuit (31) for controlling and converting electric power to be supplied to the respective driving sections, such as a drive motor (18) of the compressor (11). As an example drive circuit (31), FIG. 2 shows a drive circuit (31) of the compressor (11) which is connected to the drive motor (18) of the compressor (11). The drive motor (18) is comprised of an interior permanent magnet (IPM) motor. In the IPM motor, a permanent magnet is buried in a rotor, and a coil is wound around a stator.

The drive circuit (31) includes a rectifier circuit (32) connected to a commercial power supply (38), and an inverter circuit (34) connected to the drive motor (18) which is a driving section of the compressor (11).

The rectifier circuit (32) is connected to the commercial power supply (38) which is an AC power supply. The rectifier circuit (32) is a circuit for rectifying an AC voltage of the commercial power supply (38). The voltage rectified by the rectifier circuit (32) is called a DC link voltage (vdc).

The inverter circuit (34) converts the voltage rectified by the rectifier circuit (32) to an AC voltage, and supplies the converted AC voltage to the drive motor (18) which serves as a load. The inverter circuit (34) includes switching elements (37) which are three-phase bridge connected. The switching elements (37) are connected to a coil (not shown) wound around a stator of the drive motor (18). Examples of the switching elements (37) include an insulated gate bipolar transistor (IGBT), a MOS field effect transistor (MOS-FET), etc. The switching elements (37) do not need to be three-phase bridge connected, but may be in any phase numbers or may be connected by any connection method that is suitable for the drive motor (18). In the inverter circuit (34), the AC voltage to be output to the drive motor (18) and the frequency of the AC voltage increase and decrease by the control of switching of the switching elements (37), thereby adjusting a rotational speed of the drive motor (18). The switching of the switching elements (37) is controlled by a controller (60).

Other example configurations of the drive circuit (31) than the configuration in FIG. 2 may include a configuration in which electric power is supplied to the drive motor (18) directly from the commercial power supply (38) using only the switching elements (37). In such a case where the drive circuit (31) is comprised of only the switching elements (37), bidirectional switching devices may be used as the switching elements (37). In this configuration, the DC link voltage (vdc) is not generated, and a similar effect as in the present invention can be obtained when the switching elements (37) are controlled not to perform a switching operation in a carrier cycle in which a target value of a motor terminal voltage exceeds an input voltage.

In the electric power supply device (30) having the configuration described above, the AC voltage of the commercial power supply (38) is converted to an AC voltage having a desired frequency by using the drive circuit (31), and thereafter, the converted AC voltage is supplied to the driving section, such as the drive motor (18) of the compressor (11).

Figure 3:
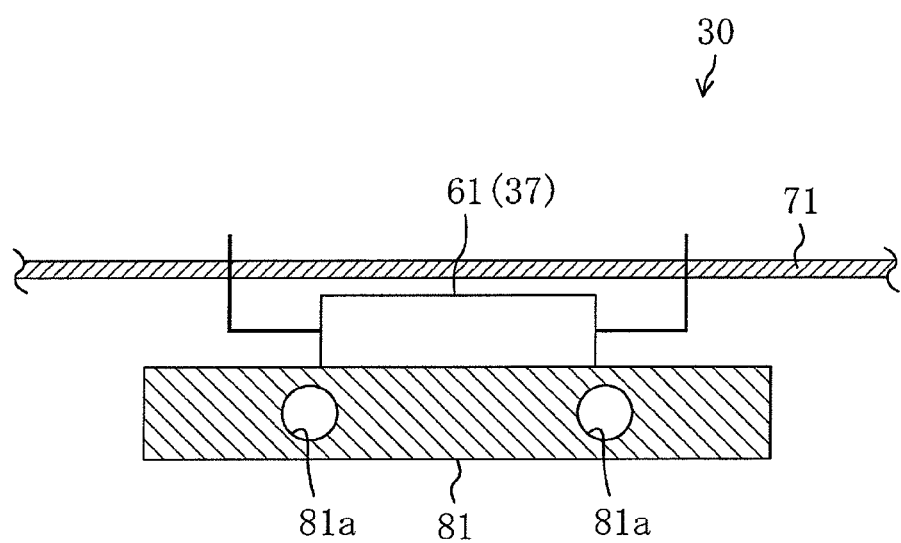
FIG. 3 is a cross-sectional view showing the vicinities of a switching element and a refrigerant cooler.

As shown in FIG. 3, in the present embodiment, the switching elements (37) of the drive circuit (31) are packaged all together by resin molding to form a single power module (61). The power module (61) does not need to be a single package. The power module (61) and other electrical equipment (not shown) are mounted on a board (71).

<Refrigerant Cooler>

The switching elements (37) generate high-temperature heat during operation. Therefore, a refrigerant cooler (81) for cooling the switching elements (37) with a refrigerant flowing in the refrigerant circuit (10) is provided. As described above, in the present embodiment, the switching elements (37) are packaged all together to form a single power module (61). As shown in FIG. 3, the power module (61) is attached to the refrigerant cooler (81) in contact with the refrigerant cooler (81). Here, a capacitor is formed between the power module (61) and the refrigerant cooler (81), with the package of the power module (61) serving as a dielectric.

The refrigerant cooler (81) is made of metal such as aluminum (i.e., a conductive material) shaped into a flat rectangular parallelepiped, and a refrigerant path (81a) in which a refrigerant flows is formed in the refrigerant cooler (81). The refrigerant path (81a) may be formed by inserting part of a refrigerant pipe, or may be formed by connecting a refrigerant pipe to a tubular through hole obtained by scraping the refrigerant cooler (81). In the present embodiment, the refrigerant path (81a) is formed by part of the fluid pipe (23) located between the heat source-side heat exchanger (12) and the expansion valve (13) of the refrigerant circuit (10) and inserted in the refrigerant cooler (81) (see FIG. 1).

With the above structure, a refrigerant flowing in the refrigerant circuit (10) can flow in the refrigerant cooler (81). Further, because the refrigerant cooler (81) is made of metal such as aluminum, the cold of the refrigerant flowing in the refrigerant cooler (81) can be transferred to the outer surface of the refrigerant cooler (81). Thus, the power module (61) which is in contact with the refrigerant cooler (81) is heat exchanged with the refrigerant flowing in the refrigerant cooler (81) and is cooled.

<Controller>

The air conditioner (1) includes a controller (60) for controlling driving of driving sections of the respective components of the refrigerant circuit (10). The controller (60) outputs a driving signal to the drive circuit (31).

The controller (60) controls a switching operation of each of the switching elements (37) which comprise a power element, thereby controlling the AC voltage to be supplied to each of the driving sections and the frequency of the AC voltage. Specifically, the controller (60) outputs a driving signal to the drive circuit (31) of each driving section so that the driving section will be in a desired state (in the case of a motor, for example, so that the motor will have a desired rotational frequency or a rotational speed and a torque). The driving signal is input to a base circuit (not shown) of each of the switching elements (37) to control ON/OFF operations of the switching elements (37). In this example, the controller (60) controls ON/OFF operations of the switching elements (37) by pulse width modulation (PWM) control. In the PWM control, the AC voltage to be supplied to each driving section is controlled to have a desired voltage and a desired frequency, by using a carrier signal as a reference of the ON/OFF control. As a result, the drive motor (18), for example, has a desired rotational frequency.

Further, the controller (60) is configured to instantaneously increase a motor terminal voltage by superimposing a harmonic on a fundamental wave component of the motor terminal voltage, thereby enabling control which increases a carrier cycle in which an instruction voltage exceeds a DC link voltage. The term "instruction voltage" as used herein refers to a target value of the motor terminal voltage, that is, a target value of an output voltage of the inverter circuit (34).

In this configuration, it is possible to effectively reduce a high frequency current which leaks from the refrigerant cooler (81), when cooling the power module (61) in which the switching elements (37) are packaged.

Specifically, a capacitor is formed between the power module (61) and the refrigerant cooler (81), with the package of the power module (61) serving as a dielectric. The capacitor is grounded through the refrigerant pipe of the refrigerant cooler (81). When the switching elements (37) perform switching, a high frequency current flows through the capacitor due to variations in potential of an internal electrode of each of the switching elements (37) relative to ground potential. The electric power supply device (30), that is, the power module (61), is accommodated in a casing (not shown) together with the heat source-side heat exchanger (12) and the compressor (11), and the high frequency current which flowed through the capacitor flows out of the apparatus through the casing and the ground lead, as described in detail later. Particularly in the case where the compressor (11) is operated at high power, a surge voltage increases with an increase in output current, and therefore, the high frequency current which flowed out of the apparatus may exceed a predetermined level, and noise problems, such as disturbance voltage, leakage current, etc., may arise.

In the present invention, however, a harmonic is superimposed on a motor terminal voltage, when cooling the switching elements (37) using the refrigerant cooler (81). Thus, the number of switching operations can be reduced.

Figure 4:
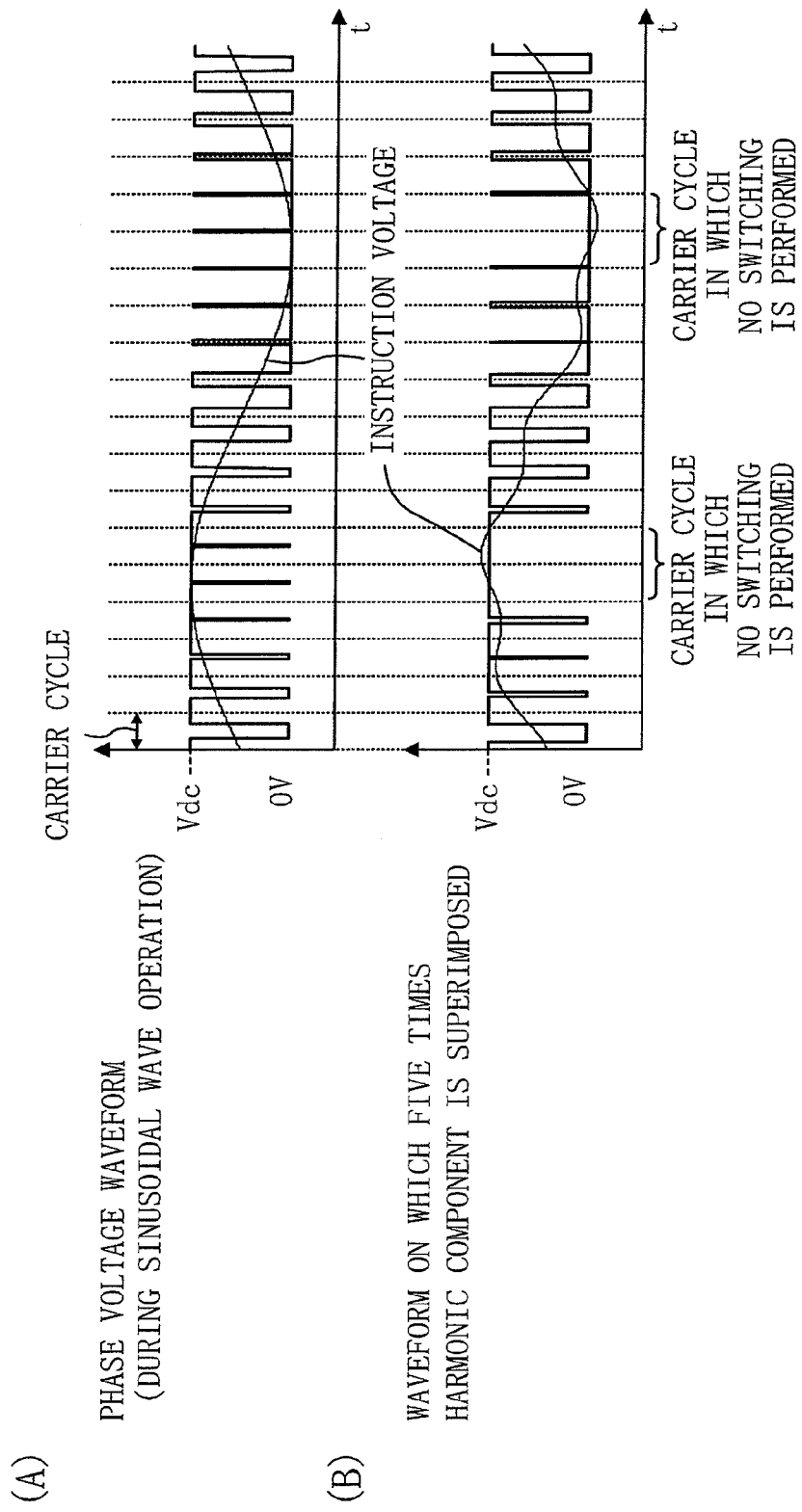
FIG. 4 is an example phase voltage waveform.

The switching waveform at this time is changed from the state shown in FIG. 4(A) to the state shown in FIG. 4(B), and control is performed such that there exists a carrier cycle (T) in which no switching is performed. For simplification, FIG. 4 shows the waveforms of a single phase inverter. In the case where a harmonic is not superimposed on the output voltage, switching is performed in all carrier cycles as shown in FIG. 4(A), whereas in the case where a harmonic is superimposed on a fundamental wave component of the motor terminal voltage, there exists a carrier cycle in which no switching is performed as shown in FIG. 4(B). FIG. 4(B) shows a waveform on which a five times harmonic component is superimposed. However, the waveform may be any waveform on which a following harmonic is superimposed, that is, a harmonic which increases a high amplitude portion of the amplitude of the fundamental wave of the motor terminal voltage to the DC link voltage (vdc), and which decreases a low amplitude portion of the amplitude of the fundamental wave of the motor terminal voltage. A waveform of so-called overmodulation is part of such a waveform. Here, the control such that there exists a carrier cycle (T) in which no switching is performed is such control in which a voltage (a DC link voltage) rectified by the rectifier circuit (32) is applied to a voltage between any of the output lines of the inverter circuit in one carrier cycle or more, thereby obtaining a carrier cycle in which switching elements of two or more phases do not perform switching in the case, for example, of a three phase inverter as in the present embodiment. Accordingly, the number of switching operations can be reduced without changing a carrier frequency.

As described later, the control performed to obtain a carrier cycle in which no switching is performed may be achieved by making an on-period shorter than 180°, and increasing a voltage necessary during the on-period. Further, in the case where the speed and the load are not under the conditions which enable the instruction voltage to exceed the DC link voltage (vdc) in maximum efficiency control, a current phase may be delayed so that the instruction voltage can be increased and the DC link voltage (vdc) can be applied to a between output lines in one carrier cycle or more.

Figure 5:
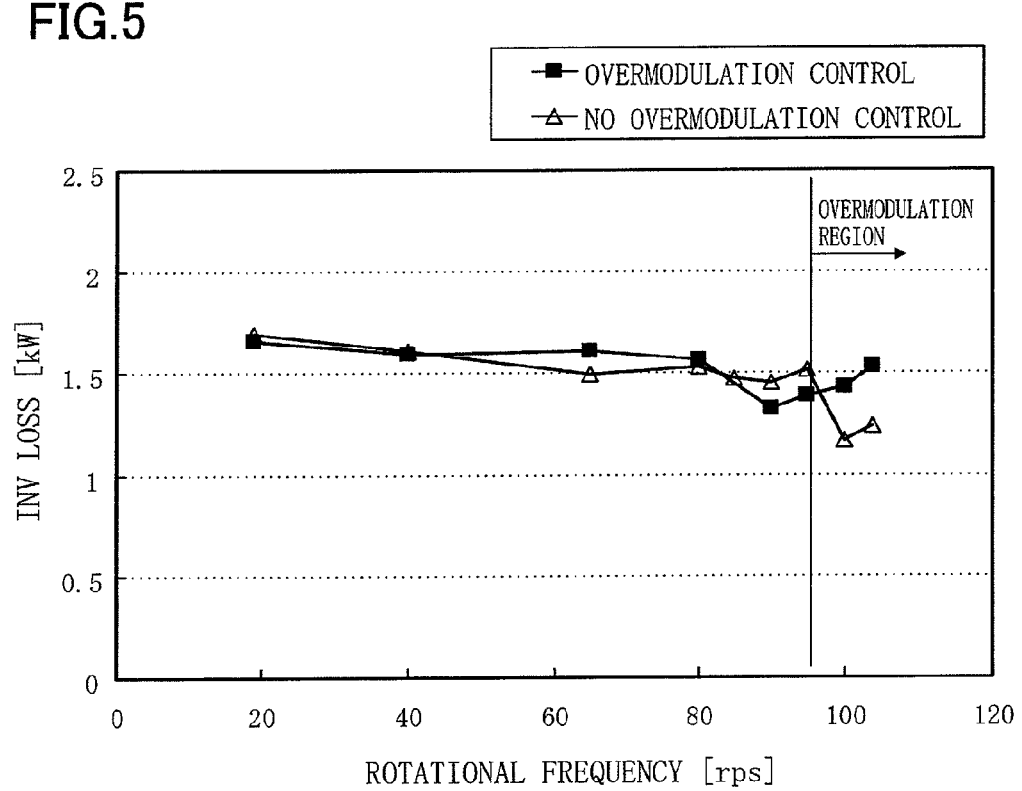
FIG. 5 is a graph showing a relationship between a rotational frequency of a compressor and an inverter loss.
Figure 6:
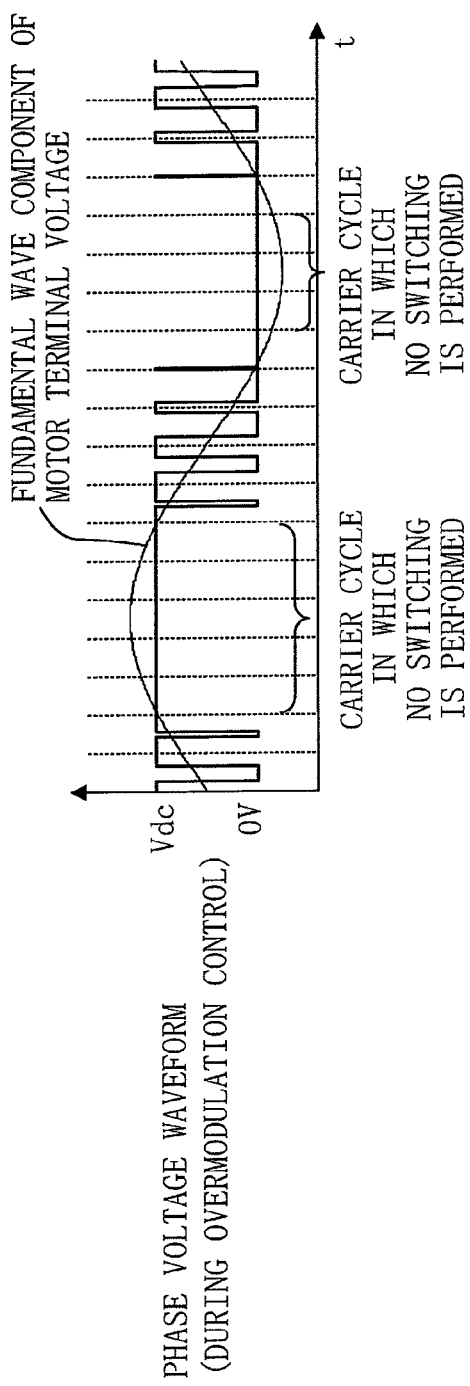
FIG. 6 shows a phase voltage waveform when a fundamental wave component of a motor terminal voltage exceeds a DC link voltage.

Thus, the high frequency current which leaks from the refrigerant cooler (81) can be effectively reduced by the reduction in number of switching operations. As a result, it is possible to reduce noise caused by the leakage current, and possible to reduce an amount of heat generation of the switching elements (37). Further, as shown in FIG. 5, in the case where the number of switching operations is reduced by performing overmodulation control in the high rotation region of the compressor (11), the reduction in the inverter loss is more significant than in the case where no overmodulation control is performed. FIG. 6 shows a switching waveform during the overmodulation control. In the carrier cycle in which a fundamental wave component of the motor terminal voltage exceeds the DC link voltage, the instruction voltage in the PWM control is set to exceed the DC link voltage. When the instruction voltage which exceeds the DC link voltage is applied, the number of switching operations is reduced by not performing the switching.

—Operation Mechanism—

Next, an operation mechanism of the air conditioner (1) will be described. The air conditioner (1) performs a cooling operation and a heating operation by switching the four-way switching valve (17).

<Refrigeration Cycle>

In cooling operation, the four-way switching valve (17) is in the first position (indicated by solid line in FIG. 1) in which the discharge side of the compressor (11) and the heat source-side heat exchanger (12) communicate with each other, and the suction side of the compressor (11) and the utilization-side heat exchanger (14) communicate with each other. The compressor (11) is driven in this state. As a result, the refrigerant circulates in a direction shown by the solid allow in FIG. 1, and a vapor compression refrigeration cycle in which the heat source-side heat exchanger (12) serves as a condenser and the utilization-side heat exchanger (14) serves as an evaporator is performed.

On the other hand, in the heating operation, the four-way switching valve (17) is in the second position (indicated by dashed line in FIG. 1) in which the discharge side of the compressor (11) and the utilization-side heat exchanger (14) communicate with each other, and the suction side of the compressor (11) and the heat source-side heat exchanger (12) communicate with each other. The compressor (11) is driven in this state. As a result, the refrigerant circulates in a direction shown by the dashed line in FIG. 1, and a vapor compression refrigeration cycle in which the utilization-side heat exchanger (14) serves as a condenser and the heat source-side heat exchanger (12) serves as an evaporator is performed.

In the cooling operation, a refrigerant condensed in the heat source-side heat exchanger (12) flows through the refrigerant path in the refrigerant cooler (81). In the heating operation, a refrigerant condensed in the utilization-side heat exchanger (14) and thereafter decompressed by passing through the expansion valve (13), flows through the refrigerant path in the refrigerant cooler (81). Although the temperature of the refrigerant flowing in the refrigerant cooler (81) varies according to operating conditions and outdoor air conditions, the temperature of the refrigerant flowing in the refrigerant cooler (81) is about 50° C., for example, in the cooling operation, and about 5° C., for example, in the heating operation.

On the other hand, the switching elements (37) generate heat during operation, and the temperature of the switching elements (37) is, for example, about 80° C. Thus, the temperature of the switching elements (37) is higher than the temperature of the refrigerant flowing in the refrigerant cooler (81). The switching elements (37) are cooled by dissipating heat to the low-temperature refrigerant flowing in the refrigerant path formed in the refrigerant cooler (81).

<High Frequency Current in Air Conditioner (1)>

During the above refrigeration cycle, electric power is supplied from the electric power supply device (30) to the drive motor (18). Here, the inverter circuit (34) performs a switching operation in which the output voltage is switched to 0 V and to the DC link voltage (vdc) by PWM control. In the inverter circuit (34) of this example, the switching elements (37) are driven by a rectangular waveform voltage. Thus, in the inverter circuit (34), the voltage rises and falls steeply, and that voltage is applied to the drive motor (18).

In the electric power supply device (30), a capacitor (hereinafter referred to as a stray capacitance (C)) is formed in which the internal electrode of each of the switching elements (37) and the refrigerant cooler (81) serve as electrodes, and the package of the power module (61) serves as a dielectric. When the voltage variation occurs in the switching elements (37) with steep rise and fall of the voltage, a high frequency current (a leakage current) flows from the power module (61) to the refrigerant cooler (81) via the stray capacitance (C). The refrigerant cooler (81) is electrically connected to the casing via the fluid pipe (23), etc., and thus, the high frequency current flows to the casing using the fluid pipe (23), etc., as a transmission path, and leaks to the outside through the ground lead, etc., connected to the casing. The high frequency current which leaks to the outside of the air conditioner (1) needs to be equal to or lower than a predetermined value according to regulations. In general, a frequency range of from 150 kHz to 30 MHz is considered as a disturbance voltage.

Figure 7:
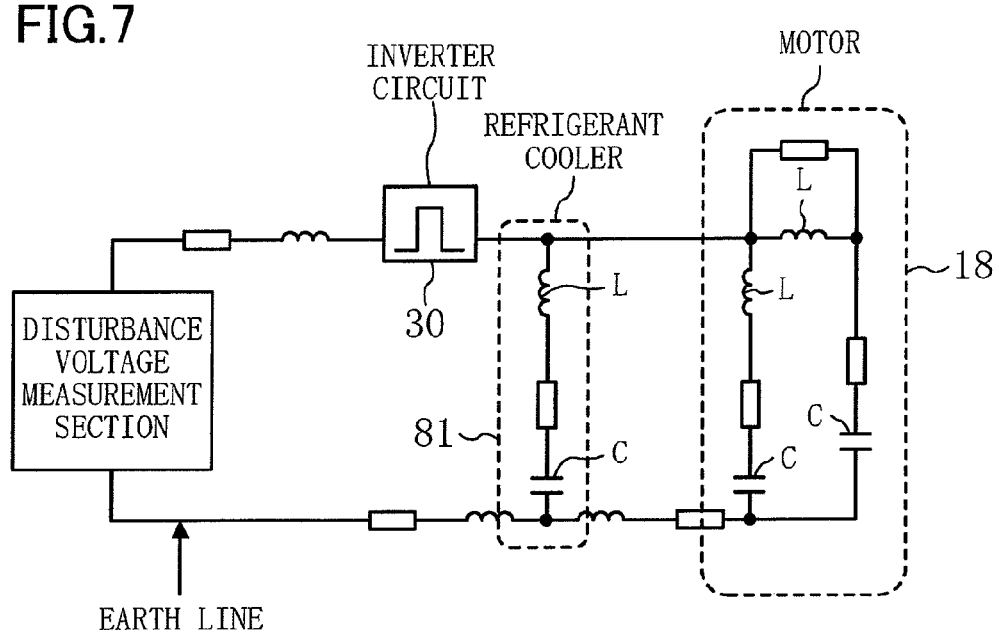
FIG. 7 is a common mode equivalent circuit of an embodiment.
Figure 8:
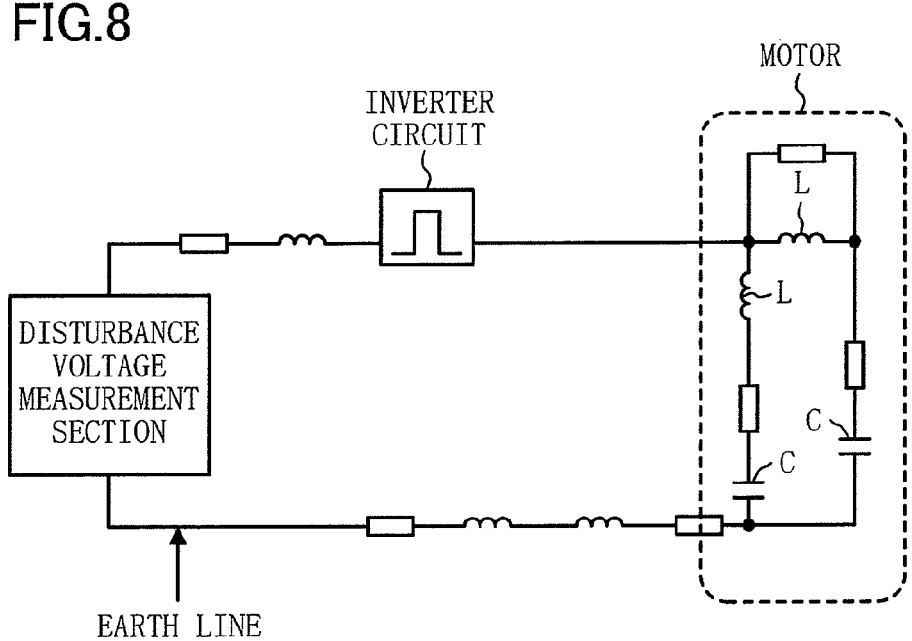
FIG. 8 is a common mode equivalent circuit in a non-grounded type electric power supply device.

The inventors of the present application found that in an air conditioner having a refrigerant cooler, if the refrigerant cooler is grounded, a resonance circuit is formed in which an inductance (L) component and the stray capacitance (C) of the refrigerant cooler are dominant, and that due to an effect of this resonance circuit, the high frequency current has a peak at a predetermined frequency. FIG. 7 shows a common mode equivalent circuit of the air conditioner (1) having a grounded refrigerant cooler. Since the refrigerant cooler is grounded, the common mode equivalent circuit is a circuit in which the inductance (L) component and the stray capacitance (C) of the refrigerant cooler are connected to an earth line. FIG. 8 shows a common mode equivalent circuit of an electric power supply device having a power module with a non-grounded cooler (referred to as a non-grounded type electric power supply device for convenience of explanation). Unlike the circuit shown in FIG. 7, the inductance (L) component and the stray capacitance (C) of the cooler can be ignored because the cooler is not grounded.

Figure 9:
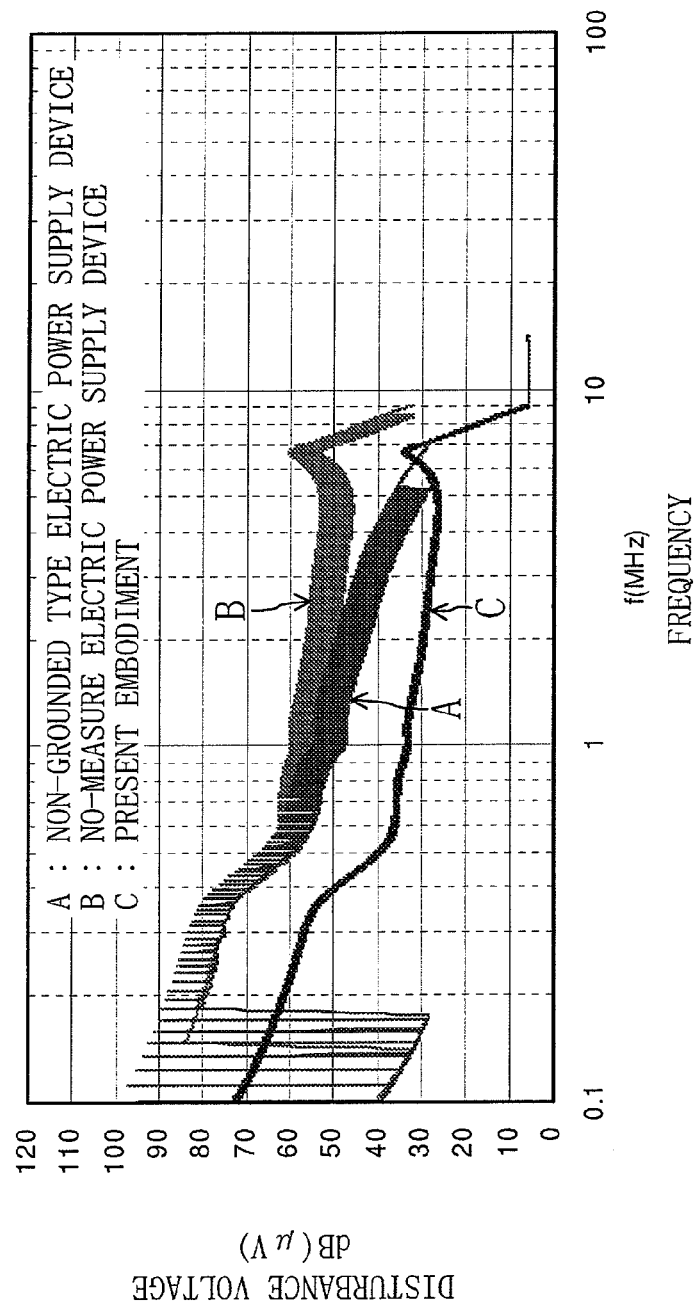
FIG. 9 shows the results of simulations of high frequency currents generated in the respective equivalent circuits of FIG. 7 and FIG. 8.

The inventors of the present application carried out simulations of characteristics of the high frequency current, using the common mode equivalent circuit of the present embodiment and the common mode equivalent circuit of the non-grounded type electric power supply device. In the simulations, a voltage measured by a disturbance voltage measurement section provided at an input of each of the common mode equivalent circuits, as shown in the respective drawings, is evaluated. FIG. 9 shows the results of the simulations of high frequency currents generated in the respective equivalent circuits of FIG. 7 and FIG. 8. In FIG. 9, the horizontal line indicates a frequency, and a vertical line indicates a disturbance voltage, that is, a level of the high frequency current (which is expressed in decibels). As shown, for example, in FIG. 7 etc., an LC component is included also in a model of the drive motor (18). However, the LC component is small, and an effect of the LC component on a low frequency, i.e., a frequency of 30 MHz or less, can be ignored.

FIG. 9 shows a high frequency current of the electric power supply device (30) of the present embodiment, a high frequency current of an electric power supply device which has a refrigerant cooler and for which no measures are taken, that is, the switching operation of the present embodiment is not performed (hereinafter referred to as a no-measure electric power supply device), and a high frequency current of the non-grounded type electric power supply device. The level (the noise level) of the high frequency current of the no-measure electric power supply device is calculated assuming that a normal switching operation is performed, that is, switching is performed in all of the carrier cycles, under control of the controller (60) of the present embodiment.

As shown in FIG. 9, if no measures are taken, the high frequency current has a peak at a predetermined frequency due to the effect of the resonance circuit. The frequency at this peak is determined mainly by the LC component of the refrigerant cooler (81). Thus, depending on specifications of the air conditioner (1), the peak may fall within a frequency range targeted as problems by regulations. In this example, the resonance point of the LC component is at a low frequency of 30 MHz or less which is considered as a disturbance voltage. Thus, a cooling operation using the refrigerant cooler (81) (i.e., cooling using a refrigerant) may cause noise problems.

A noise filter may be provided as a measure against the high frequency current having such a peak. However, the provision of the noise filter may lead to an increase in size of the apparatus and an increase in costs, which are not preferable.

FIG. 10 shows switching patterns which correspond to the respective simulations in FIG. 9. In this example, such a waveform which includes twenty carrier cycles in one rotation of the electrical angle of the motor is assumed as an example waveform in driving the drive motor (18). Further, the switching patterns are assumed to be switching patterns of a single phase inverter, and a noise reduction effect obtained by reducing the number of switching operations is examined. If the non-grounded type electric power supply device is used and switching is performed in all of the twenty carrier cycles, the level of the disturbance voltage decreases as the frequency increases (see the line A in FIG. 9). The phase voltage waveform at this time is shown in FIG. 10(A).

However, even if the same switching is performed, the noise level increases when no-measure electric power supply device (the above-mentioned electric power supply device which uses a grounded refrigerant cooler and for which no measures are taken, that is, the switching operation of the present embodiment is not performed) is used. Moreover, in the non-grounded type electric power supply device, the noise level decreases as the frequency increases, whereas in the no-measure electric power supply device, the high frequency current has a peak at a certain frequency (at about 6.8 MHz in an example of FIG. 9) (see the line B in FIG. 9). This peak frequency of the noise level is a resonance frequency of the LC component of the refrigerant cooler (81).

On the other hand, the line C of FIG. 9 shows a noise level at the time when the drive motor (18) is driven by minimum switching operations in the present embodiment. The state in which the number of switching operations is reduced to the minimum is a mode in which a half cycle of the electrical angle of the motor includes one rectangular wave. The phase voltage waveform is as shown in FIG. 10(B). When the switching elements (37) are driven in the waveform shown in FIG. 10(B), the number of switching operations is reduced to one twentieth of the number of switching operations at the time when switching is performed in each carrier cycle. In the present embodiment, the noise level decreases as a whole due to the reduction in the number of switching operations. In the example shown in FIG. 9, approximately 26 dB was reduced. As known from the figure, the noise level can be reduced to a noise level close to the noise level at the time when switching is performed in all of the twenty carrier cycles using the non-grounded type electric power supply device, also in a frequency with a peak at LC resonance of the refrigerant cooler (81).

Advantages of Embodiment

As described above, in the present embodiment, the number of switching operations is reduced by using a carrier cycle in which no switching is performed, in the air conditioner (1) using the refrigerant cooler (81) to cool the switching elements (37). As a result, in the present embodiment, the high frequency current which leaks from the refrigerant cooler (81) can be effectively reduced, and the noise caused by the leakage current can also be reduced.

Moreover, since the high frequency current is reduced by performing switching control, it is not necessary to provide additional components, such as a noise filter. That is, it is possible to reduce the high frequency current without disadvantages such as an increase in size of the apparatus as a whole and an increase in costs due to additional provision of a noise filter, etc. The technique in the present embodiment is useful particularly for such an air conditioner of which the size and the costs are increased by the provision of a noise filter, for example, an air conditioner which needs a relatively high voltage to ensure large electric power.

Further, as mentioned above, the number of switching operations of the switching elements (37) is reduced in the present embodiment. Thus, the energy which causes noise is reduced in a wider frequency range. Accordingly, in the present embodiment, the high frequency current can be reduced in a wider frequency range, not in only a specific frequency range as in the case of a noise filter.

First Variation of Embodiment

Figure 11:
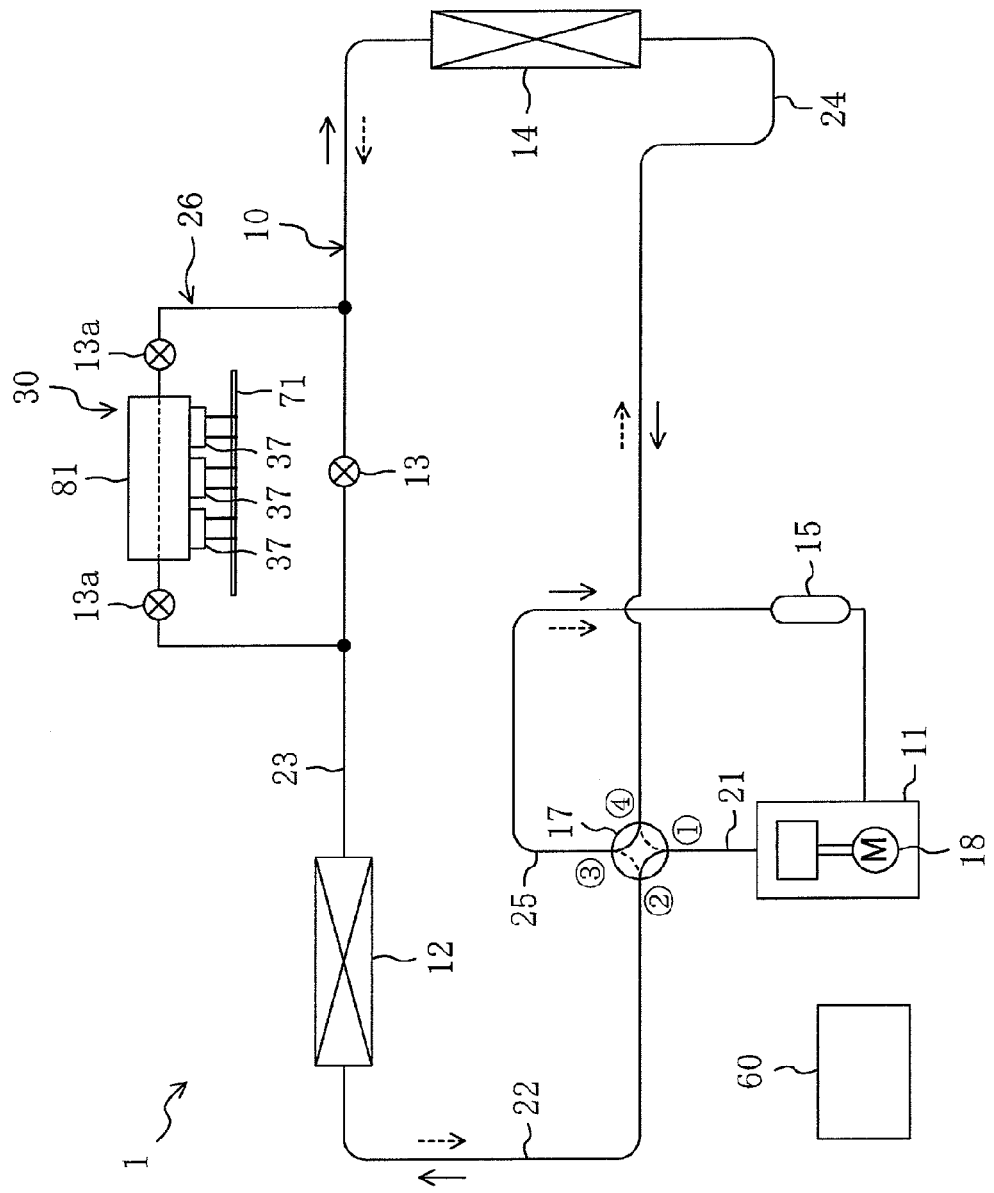
FIG. 11 is a circuit diagram schematically illustrating a configuration of an air conditioner according to the first variation.

FIG. 11 is a circuit diagram schematically illustrating a configuration of an air conditioner according to the first variation of the present embodiment. As shown in FIG. 11, a fluid pipe (23) is provided with an expansion valve (13). Further, a branch circuit (26) for separating part of a refrigerant flowing toward the expansion valve (13) is connected to the fluid pipe (23). The branch circuit (26) includes a refrigerant cooler (81) for cooling the switching elements (37). Expansion valves (13a) for controlling the temperature of the refrigerant cooler (81) are provided at both sides of the refrigerant cooler (81) in the branch circuit (26).

Figure 12:
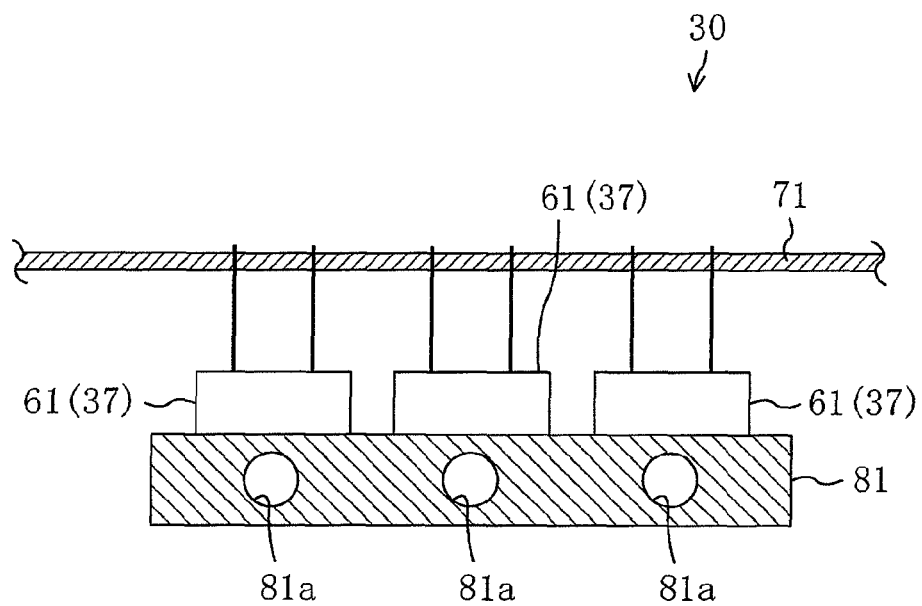
FIG. 12 is a cross-sectional view showing the vicinities of switching elements and a refrigerant cooler.

FIG. 12 is a cross-sectional view showing the vicinities of the switching elements and the refrigerant cooler. As shown in FIG. 12, a power module (61) is connected to a board (71) with wires, and is attached to the refrigerant cooler (81) in contact with the refrigerant cooler (81).

The refrigerant cooler (81) is made of metal such as aluminum shaped into a flat rectangular parallelepiped, and a refrigerant path (81a) in which a refrigerant flows is formed in the refrigerant cooler (81). The number of the power modules (61) and the number of refrigerant paths (81a) are merely example numbers, and are not limited to the numbers shown.

Second Variation of Embodiment

Figure 14:
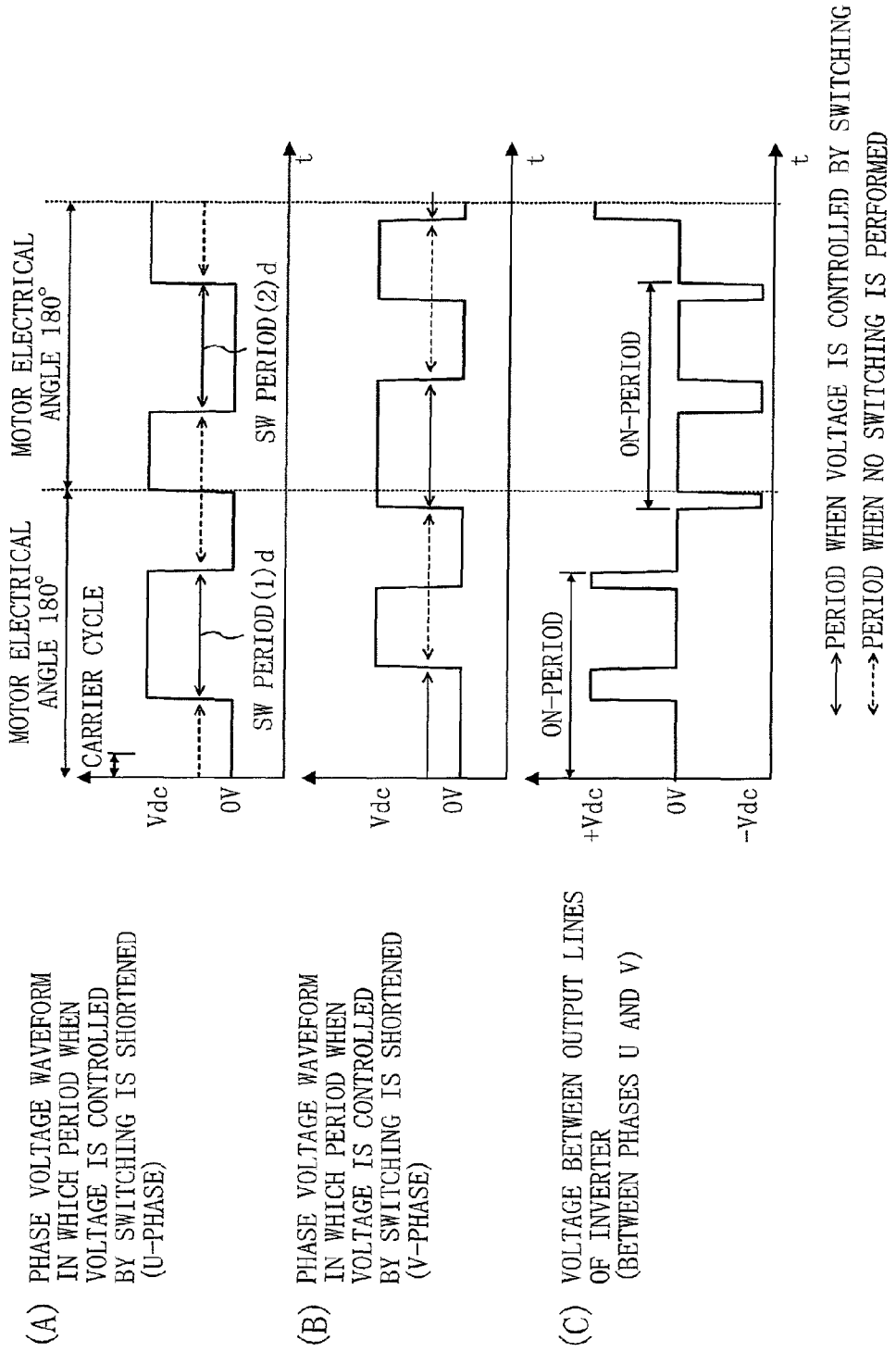
FIG. 14 shows timing charts for explaining switching patterns when an on-period is shorter than 180°.

The number of switching operations of the switching elements (37) can be reduced by a method different from the harmonic superimposition on the fundamental wave component of the motor terminal voltage. FIG. 13 and FIG. 14 show timing charts for explaining switching patterns according to the second variation. FIG. 13(A) and FIG. 13(B) respectively show a U-phase voltage waveform and a V-phase voltage waveform during a sinusoidal wave operation, and FIG. 13(C) shows a voltage between output lines (a voltage between phases U and V) of the inverter circuit (34). In this variation, a phase voltage waveform of a three phase inverter as an electric power supply device (30) is examined.

In the case where the electric power supply device (30) outputs a sinusoidal wave voltage, it is impossible not to have a period when the voltage is controlled by switching (i.e., the SW period (1)a and the SW period (2)a shown in FIG. 13(A)). Thus, the phase voltage waveform shows that successive switching operations are performed (see FIG. 13(A) and FIG.

13(B)). The waveform of the line voltage between U-phase and V-phase at this time is shown in FIG. 13(C), which shows that the line voltage has a sinusoidal wave in the electric power supply device (30). The term "on-period" as used herein refers to a period in which a line voltage is output. For example, in FIG. 13(C), the line voltage is also controlled by successive switching operations. Thus, the sinusoidal wave operation includes an on-period of 180°.

FIG. 14 shows timing charts for explaining switching patterns when the on-period is shorter than 180°. FIG. 14(A) and FIG. 14(B) respectively show a U-phase voltage waveform and a V-phase voltage waveform in the case where a period of time when the voltage is controlled by switching is shortened. FIG. 14(C) shows a voltage between output lines (a voltage between phases U and V) of the inverter circuit (34). The drawings show a state in which the SW period (1)$a$ and the SW period (2)$a$ necessary in a sinusoidal wave operation are shortened to increase the output voltage in the SW periods, and a state in which the voltage is always output in a SW period (1)$d$ and a SW period (2)$d$ (In some cases, switching may be performed in the SW period (1)$d$ and the SW period (2)$d$, depending on settings of these periods). Thus, the line voltage between the U-phase and the V-phase is as shown in FIG. 14(C). As shown FIG. 14(C), a period in which no switching operation is necessary is created by making the on-period shorter than 180°. Accordingly, in the present variation as well, the high frequency current which leaks from the refrigerant cooler (81) can be effectively reduced.

Third Variation of Embodiment

Figure 15:
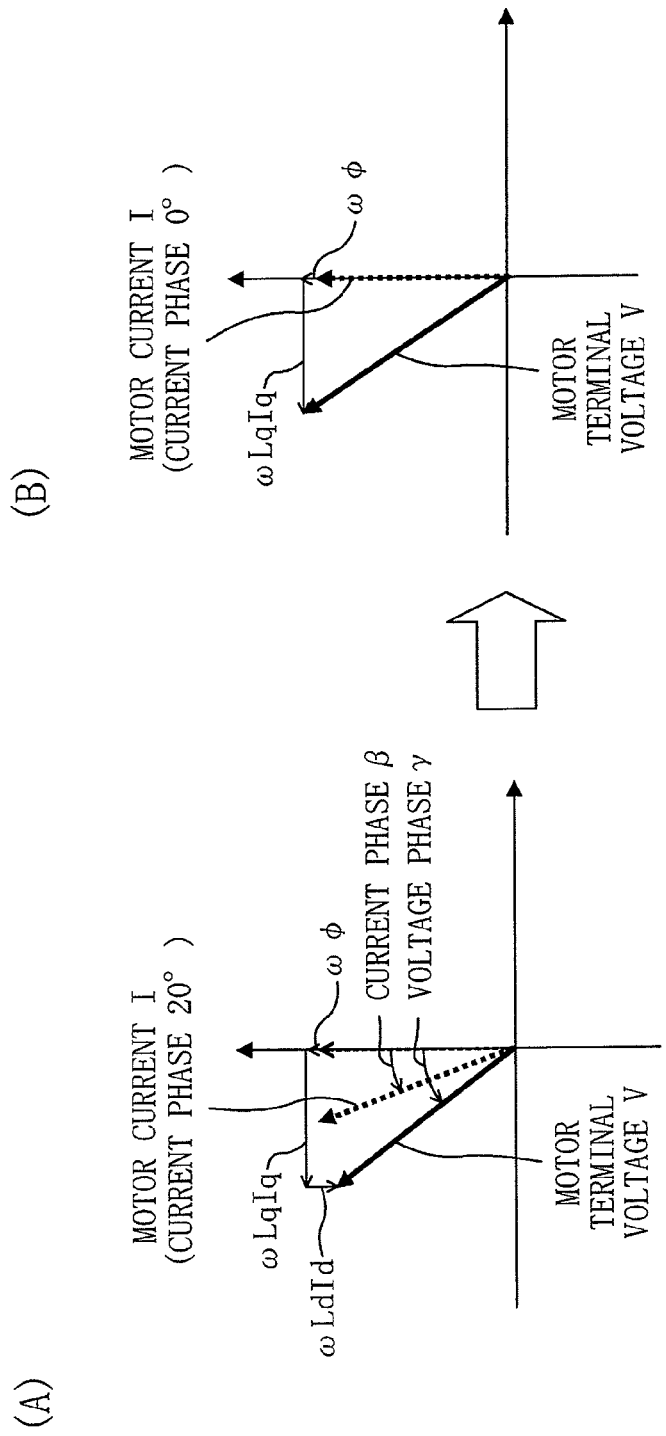
FIG. 15 shows a vector diagram of a motor terminal voltage.

In the third variation, example control that is focused on a characteristic of the IPM motor will be described. FIG. 15 shows a vector diagram of a motor terminal voltage. FIG. 15(A) is a vector diagram at maximum efficiency control. FIG. 15(B) is a vector diagram in which a current phase at the maximum efficiency control is delayed. A wire wound resistance component R of the drive motor (18) is assumed small. Thus, an R term is omitted from FIG. 15.

An equation for a voltage of a magnetic motor like an IPM motor is expressed as follows:

$$V=\sqrt{(Vd^2+Vq^2)}(Vd=RId-\omega LqIq, Vq=RIq+\omega LdId+\omega\Phi)$$

$$I=\sqrt{(Id^2+Iq^2)}(Id=-I\sin\beta, Iq=I\cos\beta)$$

As the parameters in the above equations, V represents a motor terminal voltage; Vd represents a d-axis voltage; Vq represents a q-axis voltage; I represents a motor current; Id represents a d-axis current; Iq represents a q-axis current; R represents a motor's wire wound resistance; Ld represents a motor's d-axis inductance; Lq represents a motor's q-axis inductance; Φ represents the number of crossings of a motor's magnetic flux; ω represents a rotational speed; and β represents a current phase.

For example, in the case of a drive motor (18) in which the maximum efficiency control is when the current phase is equal to 20°, the ωLdId term cancels out the voltage ωΦ generated by the magnetic flux of the magnet in the above equation, which results in a reduction in the motor terminal voltage.

On the other hand, if the current phase is delayed from the current phase at the maximum efficiency control when β is 20°, the vector diagram is as shown in FIG. 15(B). FIG. 15(B) shows the case in which β is 0° as an example. In this example, the ωLdId term is not present. Thus, there is no term which cancels out the ωΦ term of the magnetic flux of the magnet, and therefore, it is possible to increase the motor terminal voltage. FIG. 15(A) and FIG. 15(B) are illustrated under conditions in which the rotational frequency and the torque are constant.

As described above, it is possible to achieve a state in which the instruction voltage is higher than the DC link voltage (vdc) by increasing the motor terminal voltage, even in a situation where the instruction voltage cannot be higher than the DC link voltage (vdc) in the maximum efficiency control. Further, by using an IPM motor which has a relatively large inductance, variations in the ωLdId component at the time when the current phase is controlled are significant. Thus, using the IPM motor leads to a structure that is more effective in increasing the motor terminal voltage. The current phase is controlled in this example, but any one of the current phase or the voltage phase may be controlled to increase the motor terminal voltage.

Advantages of using an IPM motor as the drive motor (18) in performing control such that there exists a carrier cycle (T) in which no switching is performed can be summarized as follows.

<1> An IPM motor has a relatively large inductance. Thus, it is possible to reduce current ripple generated when control is performed such that there exists a carrier cycle in which no switching is performed. As a result, in the IPM motor, it is possible to reduce problems caused by a current increase, such as an increase in heat generation and a reduction in efficiency.

<2> Further, because the IPM motor has a relatively large inductance, when trying to increase the motor terminal voltage by controlling the phase, it is possible to achieve a greater change in the motor terminal voltage by a smaller change in the phase, compared to a motor having a small inductance. Thus, in the IPM motor, the motor terminal voltage can be easily controlled.

Other Embodiments

In the present embodiment, an air conditioner (1) was described as an example refrigeration apparatus according to the present invention. However, the refrigeration apparatus according to the present invention is not limited to the air conditioner (1). For example, the refrigeration apparatus according to the present invention may be a refrigeration apparatus for cooling the inside of a refrigerator or a freezer.

Further, the location from which the refrigerant is taken into the refrigerant cooler (81) and the method for doing the same are not limited to those described above, and may be any apparatus having a configuration in which the refrigerant pipe of the refrigerant circuit (10) and the refrigerant cooler (81) are connected to each other.

Further, in the case where an electric power conversion circuit (such as a so-called PWM converter, etc.) which converts an alternating current to a direct current is used as the electric power supply device (30), the present invention can be used to control the electric power conversion circuit.

INDUSTRIAL APPLICABILITY

The present invention has a highly practical effect as described above, that is, when cooling switching elements using a refrigerant cooler, in which a refrigerant flowing in a refrigerant circuit flows, it is possible to effectively reduce a high frequency current which leaks from the refrigerant cooler. Thus, the present invention is very useful and highly applicable in the industry.

DESCRIPTION OF REFERENCE CHARACTERS 1 air conditioner (refrigeration apparatus)
10 refrigerant circuit
11 compressor
12 heat source-side heat exchanger
13 expansion valve (expansion mechanism)
14 utilization-side heat exchanger
18 drive motor
37 switching element
60 controller (control section)
81 refrigerant cooler

The invention claimed is:
1. A refrigeration apparatus, comprising:
a refrigerant circuit in which a compressor, a heat source-side heat exchanger, an expansion mechanism, and a utilization-side heat exchanger are connected to perform a refrigeration cycle, wherein
the refrigeration apparatus includes
a power module including a plurality of switching elements each of which converts an input voltage to an AC voltage having a predetermined frequency and a predetermined voltage value,
an IPM motor which drives the compressor,
a rectifier circuit which supplies a DC link voltage to the power module,
a refrigerant cooler in which a refrigerant in the refrigerant circuit flows and which cools the power module, the refrigerant cooler being grounded thereby forming an inductance component and a stray capacitance, wherein a current flows out of the refrigeration apparatus through the stray capacitance, and
a control section which controls an operation of each of the switching elements by performing overmodulation control when a rotational frequency of the compressor exceeds a predetermined level such that there exists a carrier cycle in which no switching is performed, wherein the IPM motor has sufficient inductance to reduce a ripple in an output current of the power module resulting from the overmodulation control.
2. The refrigeration apparatus of claim 1, wherein
the control section controls a voltage phase or a current phase to be applied to the IPM motor, thereby adjusting a motor terminal voltage in a same operation state.
3. The refrigeration apparatus of claim 1, wherein
the control section does not perform the switching when a target value of a motor terminal voltage exceeds the DC link voltage.

* * * * *